(12) United States Patent
Nishino

(10) Patent No.: US 6,222,992 B1
(45) Date of Patent: Apr. 24, 2001

(54) EXTREME INFRA-RED RAYS AIR CONDITIONING APPARATUS

(75) Inventor: Munetake Nishino, Tokyo (JP)

(73) Assignee: KabushikiKaisha Inter Central, Iwate-gun (JP)

( * ) Notice: Subject to any disclaimer, the term of this patent is extended or adjusted under 35 U.S.C. 154(b) by 0 days.

(21) Appl. No.: 09/221,129

(22) Filed: Dec. 28, 1998

(30) Foreign Application Priority Data

Dec. 26, 1997 (JP) .................................................... 9-366830

(51) Int. Cl.⁷ .................................................... F24D 13/02
(52) U.S. Cl. .............................................. 392/439; 392/353
(58) Field of Search ........................... 392/439, 432–436, 392/408, 386, 352, 353; 432/225; 219/543, 522, 203

(56) References Cited

U.S. PATENT DOCUMENTS

| 2,954,456 | * | 9/1960 | Calhoun et al. ..................... | 392/353 |
| 3,062,945 | * | 11/1962 | Glynn .................................. | 392/439 |
| 3,221,139 | * | 11/1965 | Orr ..................................... | 392/353 |
| 3,582,614 | * | 6/1971 | Zellers ................................ | 392/436 |
| 3,691,345 | * | 9/1972 | Needham et al. .................. | 392/436 |
| 3,859,498 | * | 1/1975 | Steinmetz ........................... | 392/432 |
| 4,247,979 | * | 2/1981 | Eck ..................................... | 29/611 |
| 4,398,883 | * | 8/1983 | Vetter et al. ....................... | 432/225 |
| 4,488,033 | * | 12/1984 | Trachtenberg ..................... | 219/522 |
| 4,587,402 | * | 5/1986 | Nishino et al. ..................... | 338/308 |
| 4,970,376 | * | 11/1990 | Mellor et al. ...................... | 219/543 |
| 5,388,177 | * | 2/1995 | Ono et al. .......................... | 392/386 |
| 5,643,483 | * | 7/1997 | Kubota et al. ..................... | 219/543 |

FOREIGN PATENT DOCUMENTS

| WO 9105209 | * | 4/1994 | (DE) | ................................ | F24D/13/02 |
| 2510730 | * | 3/1983 | (FR) | ................................ | 392/436 |

\* cited by examiner

*Primary Examiner*—Teresa Walberg
*Assistant Examiner*—Quang Van
(74) *Attorney, Agent, or Firm*—Jacobson, Price, Holman & Stern, PLLC

(57) ABSTRACT

An extreme infra-red rays air conditioning apparatus have a rear face plate installed on the rear face of the apparatus, a casing of square-box shape having an opening at its front face, heat radiation glass plate each made of heat-resisting reinforced glass having a plurality of small dents continuously formed or its whole face and a flat rear face. The size of glass plate is smaller than the opening of the casing and fixed to both side portions at the front face side by means of side portions of the glass plate. The air conditioning apparatus further has a number of linear shape heat generator made by melting metal alloy powder consisting of aluminum, copper, iron and the like on the flat rear face of the heat radiation glass plate in shape of printed circuit, reflex plate respectively fixed to the casing leaving gap at rear face sides of the glass plate, and extension members opening outwardly and expanded and extended to the front side end edge portions of the casing leaving distribution openings.

3 Claims, 4 Drawing Sheets

EXTREME INFRA-RED RAYS AIR CONDITIONING APPARATUS

BACKGROUND OF THE INVENTION

(1) Field of the Invention

The invention relates to an extreme infra-red rays air conditioning apparatus creating a comfortable warm and hot environment of a room or an enclosed space by means of an extreme infra-red rays air conditioning apparatus, and attaining a saving of the energy to be used in the air conditioning apparatus.

(2) Prior Art

Nowadays, an extreme infra-red rays air conditioning apparatus employing heat radiation glass plates has been known through an official gazette of Japanese Patent Publication No. 34371/1988.

According to the extreme infra-red rays air conditioning apparatus disclosed in the official gazette mentioned above, it has heat radiation plates shaped in waves on their whole surfaces and such waves are continuously and many in number. So, extreme infra-red rays distribute in a wide range or space by means of the waved and curved surfaces of the glass plates with large radiation angles of infra-red rays, however, it has been very difficult to stick a linear shape heat generator on the waved and curved surfaces in a shape of printed circuit.

In addition, there is no reflection plate on rear faces of the heat radiation glass plates, so that heat of the heat radiation glass plates heated by the linear shape heat generator is escaped to the rear faces of the glass plates resulting in poor thermal efficiency of the conventional infra-red rays air conditioning apparatus. Also, because all extreme infra-red rays fail to radiate in the room or space to be warmed or heated, which rays are radiated from the heat radiation glass plates, and half of all rays radiates to the rear face side of the glass plate, it has been problem of poor efficiency of infra-red rays radiation.

BRIEF DESCRIPTION OF THE INVENTION

The invention relates to an extreme infra-red rays air conditioning apparatus comprising a plurality of glass plates of heat-resisting reinforced glass made of mainly silica radiating extreme infra-red rays, said glass plates providing with a number of small depressions or dents formed all over the surfaces of the glass plates, and linear shape heat generators made by sticking metal alloy powder consisting of aluminum, copper, iron and the like onto the rear face of the heat radiation glass plates in a shape of printed circuits, wherein the heat generator is energized and generates heat to warm the heat radiation glass radiating heat, and radiate extreme infra-red rays from the heat radiation glass plates of the heat radiation reinforced glass.

It is a first purpose of the invention to provide an extreme infra-red rays air conditioning apparatus enabling to create comfortable warm temperature environment in a room or enclosed space by means of extreme infra-red rays air conditioning system, with relatively little energy for the air conditioning apparaus.

It is the second purpose of the invention to provide an extreme infra-red rays air conditioning apparatus having a plurality of heat radiation glass plates, wherein heat and extreme infra-red rays from the heat radiation glass plates spreads out into a room or enclosed space with a wide radiation angle and the apparatus has a high thermal efficiency and a high extreme infra-red rays radiation efficiency.

The third purpose of the invention is to provide an extreme infra-red rays air conditioning apparatus in which a linear shape heat generator is easy to stick and melt on heat radiation glass plates.

The fourth purpose of the invention is to provide an extreme infra-red rays air conditioning apparatus which is able to be used by fixing it on a wall or a ceiling of a house and to be used as a portable one by standing or placing it on a floor.

These purposes mentioned above and other purposes and characteristics of the invention will be apparent by reading the following detailed explanation with reference to the attached drawings. These drawings are only for explaning the invention and don't restrict the scope of the invention.

DETAILED EXPLANATION OF THE INVENTION

Figure 1:
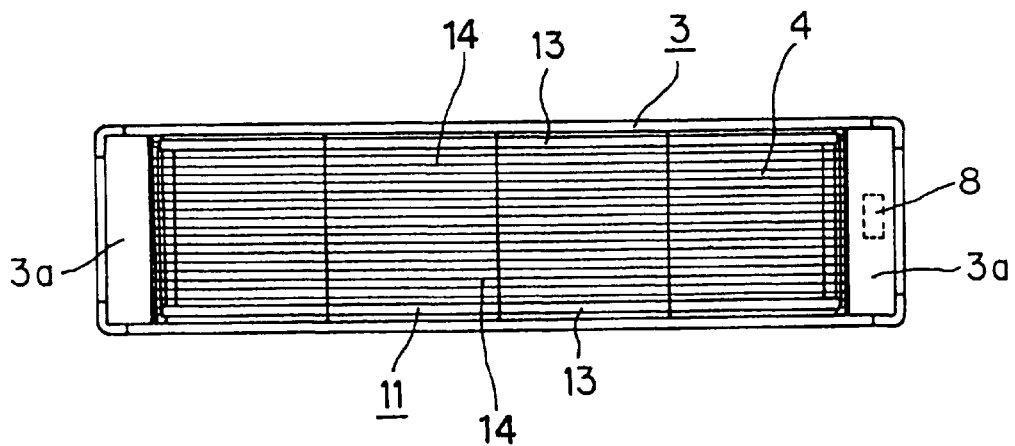
FIG. 1 is a front view of the extreme infra-red rays air conditioning apparatus of the invention.
Figure 2:
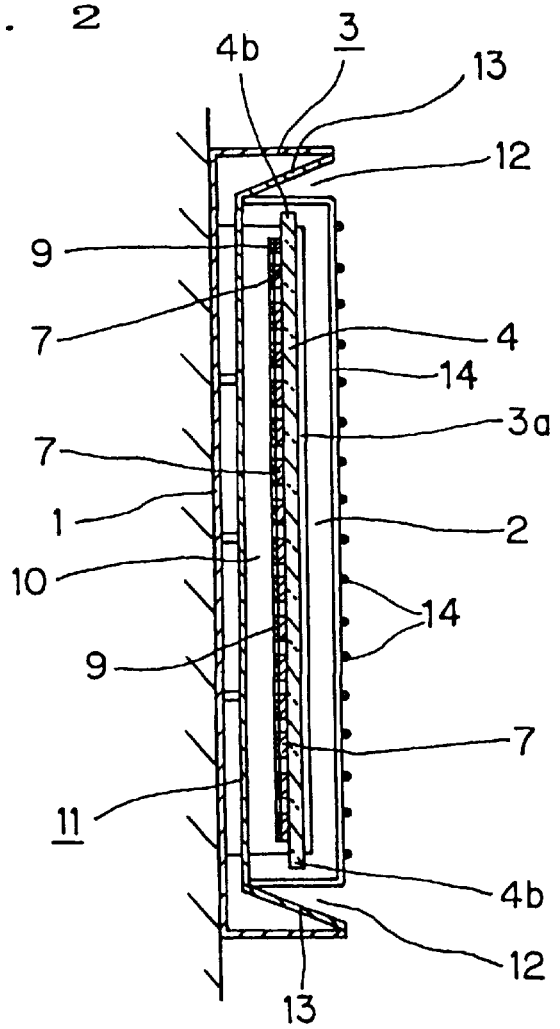
FIG. 2 is an enlarged transversal sectional view of the apparatus of the invention.
Figure 3:
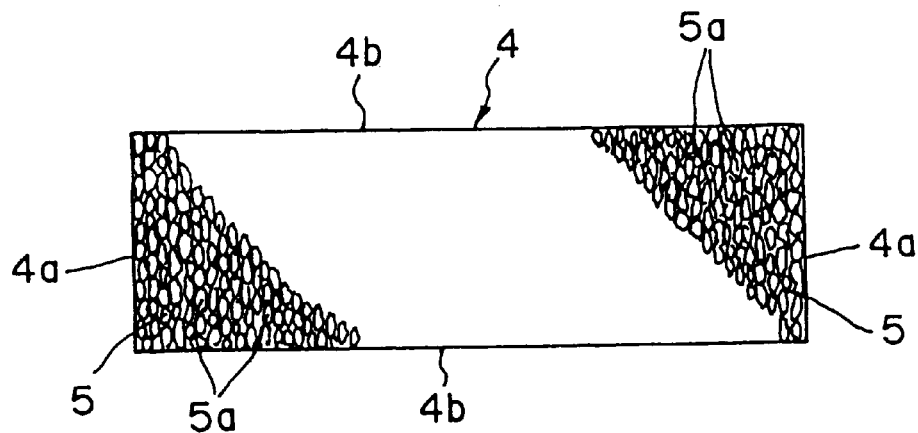
FIG. 3 is a front view of the heat radiation glass plate installed in the apparatus of the invention.

Explaining the invention in detail with reference to the acccompanying drawings, in particular FIGS. 2 and 3, a rear face plate 1 is placed on a rear face of the extreme infra-red rays air conditioning apparatus and both side portions 4a of the heat radiation glass plate 4 made of heat resisting reinforced glass, which glass plate being made smaller than an opening portion 2 of a casing 3, are attached to attachment pieces 3a. The casing 3 is formed in a square box type having the opening 2 formed on a front face of the air conditioning apparatus and the attachment pieces 3a are inwardly bent from both side portions at front face sides of the casing 3.

In order to make the radiation area wide, the heat radiation glass plate 4 has a plurality of small dents 5 formed on the whole surface of the glass plate 4. The glass plate 4 has a flat portion 6 formed on its whole rear face.

Figure 4:
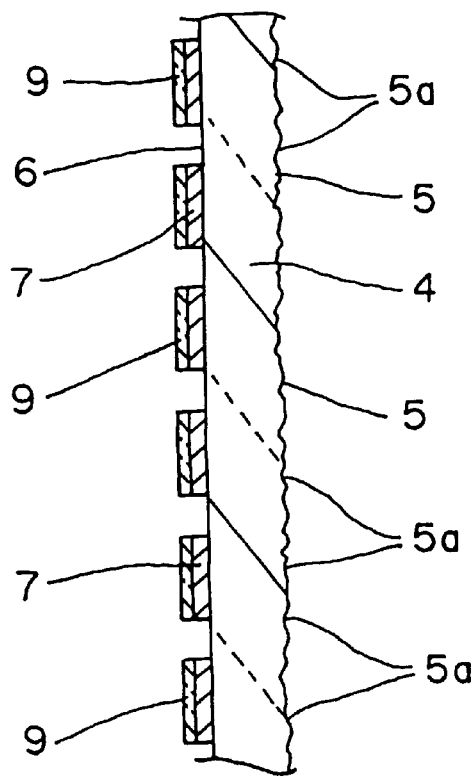
FIG. 4 is an enlarged transversal sectional view of the heat radiation plate shown in FIG. 3.
Figure 5:
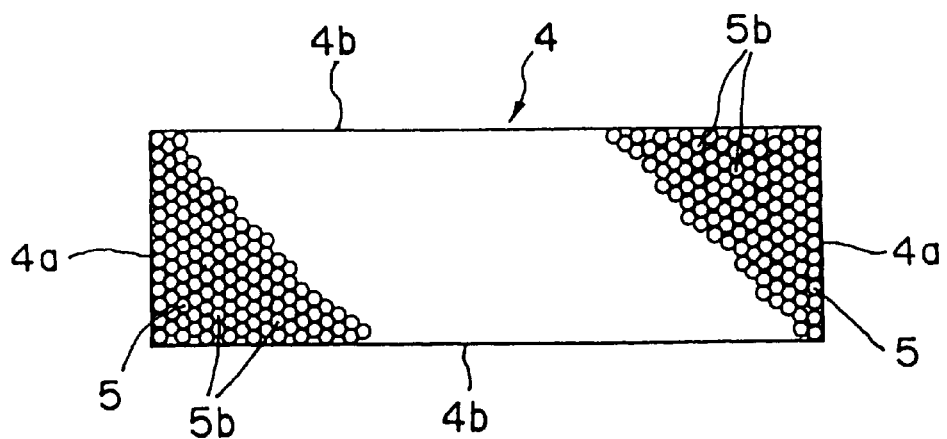
FIG. 5 is a front view of the another embodiment of the heat radiation glass plate installed in the apparatus of the invention.
Figure 6:
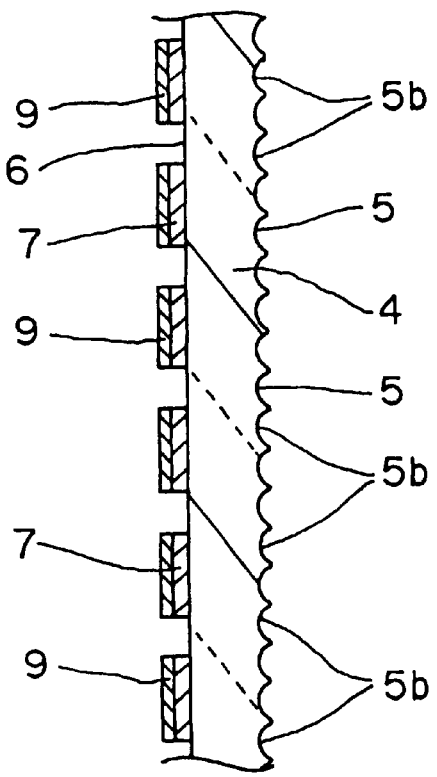
FIG. 6 is an enlarged transversal sectional view of the heat radiation plate shown in FIG. 5.

As shown in FIG. 3 and FIG. 4, the small dents 5 may be of small dents 5a of irregular shape and, as shown in FIG. 5 and 6, it may be of small dents 5b of circular shape.

On the rear flat face portion 6 of the heat radiation glass plate 4, a linear shape heat generator 7 is formed by welding metal alloy powder consisting of aluminum, copper, iron and the like on the almost of all of the surface of the rear flat face portion 6 in shape of printed circuits. Edge portions of the linear shape heat generator 7 is connected to circuit bases 8.

Figure 7:
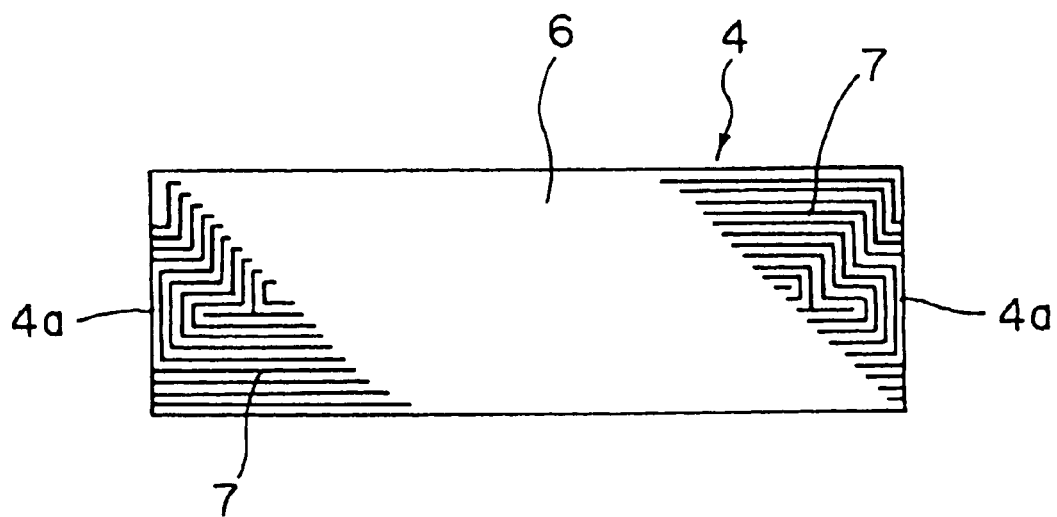
FIG. 7 is a rear view of the heat radiation glass plate installed in the apparatus according to the invention.

Energizing the linear shape heat generator 7 to generate heat, the heat radiation glass plate 4 is heated and they radiate heat. Enamel paint a is applied or laminated on the linear shape heat generator 7 in order to cover the generator 7, as a result, a cover layer 9 prevents a chemical reaction (deoxidization) of the linear shape heat generator 7 (the cover layer 9 is not depicted in the drawing of FIG. 7).

Because the linear shape heat generator 7 is melted or thermal-bonded to the rear flat face of the heat radiation glass plate 4, the sticking work is very easy.

After the heat radiation glass plate 4 is heated, heat is radiated along a front face direction (room interior direction) of the glass plate 4 and a rear face direction (to a wall face of attached face or to the ceiling). In order to reflect the heat radiation advanced or radiated toward the rear face of the glass plate 4 along its front face direction, reflex plates 11 made of aluminum are attached to the casing 3 leaving a gap 10 in a space at rear face side of the heat radiation glass plate 4. The reflex plate 11 has an extension member 13 expanded outwardly toward and near to the edge portions at the front face side of the casing 3 leaving a distribution opening 12 in a space of the upper and the lower end portions 4b of the heat radiation glass plate 4 failing to be fixed to the casing 3.

As a result, impressing electricity through the linear shape heat generator 7, the generator 7 radiates heat and the heat radiation glass plate 4 is heated. The heat radiated toward the rear face side of the heat radiation glass plate 4 is reflected toward the front face side by means of the reflex plate 11, and also the heat is expanded owing to the extension member 13 and radiated into the room through the distribution opening 12.

That is, air heated by the heat radiation glass plate 4 rises and stays temporarily within the gap 10 and other heated air rises to push the stayed hot air up. Hot air flows along the interior faces of the reflex plate 11 by means of convection phenomenon and further advances through the distribution opening 12. Finally, hot air expands and radiates to the interior of the room by means of the extension member 13.

The reflex plate 11 have the functions, other than a reflection one reflecting the heat flown from the heat radiation glass plate 4, of reflecting extreme infra-red rays radiated toward the rear face of the glass plate 4 along the front face direction.

Extreme infra-red rays radiated from the heat radiation glass plate 4 make invisible micro-particles or corpuscles suspended in air within the gap 10 have extreme infra-red rays radiation characteristics. The extreme infra-red rays radiation characteristics of the room interior are large. In order to prevent the user of the air conditioning apparatus of the invention from touching the heat radiation glass plate 4, a guard cover 14 is attached or fixed on the front face of the apparatus.

According to the extreme infra-red rays air conditioning apparatus provided with the structure mentioned above, energizing the linear shape heat generator 7 make the generator and the heat radiation glass plate 4 respectively heated radiating extreme infra-red rays from the glass plate 4. All heat and infra-red rays radiated from the heat radiation glass plate 4 diffuse and radiate into the room through the distribution opening 12 by means of the reflex plate 11.

Why the heat radiation glass plate 4 radiate extreme infra-red rays is that the glass plate 4 mainly contain silica having high extreme infra-red rays radiation rate or efficiency of more than 90%. The larger the volume of silica contained in the glass plate 4 is, the higher the radiation efficiency of extreme infra-red rays is.

Due to the number of small dents 5 continously formed in whole surface of the heat radiation glass plate 4, the radiation area is made large and extreme infra-red rays diffused-reflect. As a result, heat at and extreme infra-red rays radiate with wide radiation angles and heat reaches every corner of the room to be heated.

It is preferable to set the surface temperature of the heat radiation glass plate 4 at about 150 to 170° C. The surface temperature is set by a resistance value fixed by the design of the linear shape heat generator 7 melted and stuck on the heat radiation glass plate 4 in a shape of printed circuits. In order to improve safety of the air conditioning apparatus of the invention, a thermostat or limit switch (not shown) is installed on the apparatus preventing surface temperature from rising more than the set temperature.

The extreme infra-red rays air conditioning apparatus of the invention and having the structure described above is able to fix on a wall or ceiling through the rear face plate 1, but it is also possible to use the apparatus by mounting casters or a stand on its bottom and standing it on a floor. When it is a type of standing on floors, it is called an air conditioning apparatus of portable type.

An experiment has been done with different or various surface areas and consuming electric power of the heat radiation glass plate 4 of the extreme infra-red rays air conditiong apparatus according to the invention in order to determine the maximum heat generation volume and various extreme infra-red rays radiation rates or efficiency.

The results of the experiment are shown in the following table.

| | heat radiation glass plate measurement | | | consume | max | Radiation |
|---|---|---|---|---|---|---|
| | width (mm) | height (mm) | thick (mm) | electricity Kw | energy kcal/h | rate % |
| A | 590 | 350 | 48 | 0.2 | 172 | 93.5 |
| B | 920 | 270 | 48 | 0.4 | 344 | 93.8 |
| C | 840 | 350 | 48 | 0.5 | 430 | 94.0 |
| D | 745 | 495 | 48 | 0.6 | 516 | 94.2 |
| E | 1,375 | 270 | 48 | 0.8 | 688 | 94.4 |
| F | 840 | 525 | 48 | 1.0 | 860 | 94.8 |
| G | 1,375 | 350 | 48 | 1.0 | 860 | 94.8 |
| H | 1,100 | 470 | 48 | 1.2 | 1,032 | 95.0 |
| I | 1,375 | 470 | 48 | 1.5 | 1,290 | 95.2 |
| J | 1,680 | 470 | 48 | 2.0 | 1,720 | 95.5 |

It is known from the table that when the consuming electric power increases, of course heat value generated increases. And when heat value generated increases, it is apparent that extreme infra-red rays radiation rate rises.

Furthermore, measuring wave lengths of extreme infra-red rays radiation from the extreme infra-red rays air conditioning apparatus according to the invention, it is found that absorbing or absorption efficiency of extreme infra-red rays into human bodies is high, so it is said that particular extreme infra-red rays of wave lentgh: about 8 $\mu$m radiate from the heat radiation glass plate 4. The extreme infra-red rays having a wave length of about 8 $\mu$m is said that they have a heating efficiency of very high.

The extreme infra-red rays air conditioning apparatus according to the invention has, apparently from description above, the following effects. Because the rear face of the heat radiation glass plate is made flat, it is very easy to stick or melt the linear shape heat generator on the flat rear face.

A reflex plate is installed on the rear face side of the heat radiation glass plate leaving a gap, and also the reflex plate has an extension member opening and expanding outwardly connected thereto, so that heat and extreme infra-red rays radiated into the gap formed at the rear face of the heat radiation glass plate is reflected by means of the reflex plate, then the heat and rays distribute into the room through the distribution opening resulting in heat flowing and radiating toward into the room interior. A number of small dents are provided on the whole front surface of the heat radiation glass plate, so a radiation area of the whole front surface increases and the radiation diffused-reflects. Accordingly, heat and extreme infra-red rays from the heat radiation glass plate advance with wide radiation angles reaching every corner of the room or enclosed space, resulting in a high thermal efficiency and a high extreme infra-red rays radiation efficiency and in energy saving of the extreme infra-red rays air conditioning apparatus of the invention.

The extreme infra-red rays air conditioning apparatus of the invention is able to use not only after fixing on a wall or ceiling of the room, but also after standing or placing on a floor of the enclosed space as a portable type one.

What is claimed is:

1. An extreme infra-red rays air conditioning apparatus comprising a rear face plate provided on a rear face of a square-box type casing having an opening at a front face, a heat radiation glass plate made of heat-resisting reinforced glass having a plurality of small dents formed continuously on a whole front face surface of the glass plate and a rear face of the glass plate made of wholly flat shape, and said heat radiation glass plate having a size smaller than the opening of the casing and only fixed to both side portions of the casing at the front face side of the casing through both side portions of the glass plate, a linear shape heat generator made by melting and bonding metal alloy powder on the rear face of the heat radiation glass plate in a shape of a printed circuit, said linear shaped heat generator having a lamination layer made by painting an enamel paint thereon, the surface temperature of said heat radiation glass plate being set so as to become 150–170° C., said heat radiation glass plate being secured to fixing pieces respectively made by inward-bending both side portions of the front face of said casing by both side portions of the glass plate, a reflex plate made of aluminum being fixed to said casing, an unobstructed gap formed between said rear face of said glass plate and said reflex plate, a plurality of extension members of said reflex plate being expanded and opening outwardly in a continuous straight line to adjacent to forwardly projecting edge portions of the casing at the front face of the casing, said upper and lower portions of the heat radiation glass plate being free of any connection to the casing, said upper and lower portions of said heat radiation glass plate being vertically spaced from said extension members so that extreme radiation characteristics given to floating particles located in said gap between said heat radiation glass plate and said reflex plate are lifted upwardly to pass above said upper portion of said heat radiation glass plate until encountering an upper one of said extension members and being deflected free of obstruction along the continuous straight line of said one extension member.

2. The extreme infra-red rays air conditioning apparatus of claim 1, wherein said small dents are of non-fixed or irregular shape.

3. The extreme infra-red rays air conditioning apparatus of claim 1, wherein said small dents are of circular shape.

* * * * *